(12) United States Patent
Pieters et al.

(10) Patent No.: US 8,759,449 B2
(45) Date of Patent: Jun. 24, 2014

(54) WIPER RUBBER FOR WINDSHIELD WIPERS

(75) Inventors: Eric Pieters, AK Simpelveld (NL); Reiner Lay, Aachen (DE); Harald Kleinknecht, Alzey (DE); Hilde Parton, Oud-Heverlee (BE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 12/745,097

(22) PCT Filed: Nov. 11, 2008

(86) PCT No.: PCT/EP2008/065322
§ 371 (c)(1),
(2), (4) Date: May 27, 2010

(87) PCT Pub. No.: WO2009/068434
PCT Pub. Date: Jun. 4, 2009

(65) Prior Publication Data
US 2010/0263156 A1    Oct. 21, 2010

(30) Foreign Application Priority Data
Nov. 28, 2007   (DE) .......................... 10 2007 057 133

(51) Int. Cl.
| C08K 5/3412 | (2006.01) |
| C08K 5/3417 | (2006.01) |
| C08K 5/3492 | (2006.01) |
| C08K 5/44 | (2006.01) |
| C08K 5/47 | (2006.01) |
| B60S 1/38 | (2006.01) |

(52) U.S. Cl.
USPC ........ 525/194; 525/196; 525/215; 525/331.1; 525/332.7; 525/333.1; 525/349; 525/375; 524/526; 524/527; 524/572; 15/250.001; 15/250.48

(58) Field of Classification Search
USPC ........ 525/194, 196, 215, 331.1, 332.7, 333.1, 525/349, 375; 524/526, 527, 572; 15/250.001, 250.48
See application file for complete search history.

(56) References Cited

U.S. PATENT DOCUMENTS

| 3,366,598 | A | * | 1/1968 | Westlinning et al. | 524/571 |
| 4,256,858 | A | * | 3/1981 | Behr | 525/279 |
| 5,567,821 | A | * | 10/1996 | Kuczkowski et al. | 548/126 |
| 5,830,817 | A | * | 11/1998 | Graf et al. | 502/167 |
| 6,495,625 | B1 | * | 12/2002 | Abe et al. | 524/495 |
| 6,500,884 | B1 | | 12/2002 | Tsujimura et al. | |
| 7,687,565 | B2 | * | 3/2010 | Geilenkirchen | 524/495 |
| 2010/0319824 | A1 | * | 12/2010 | Pender | 152/151 |

FOREIGN PATENT DOCUMENTS

| DE | 2120288 A1 | | 11/1972 |
| DE | 3888760 T2 | | 7/1994 |
| DE | 19944274 A1 | | 3/2001 |
| JP | 7025962 | | 3/1995 |
| JP | 63287645 | | 11/1998 |
| JP | 11-335566 | * | 12/1999 |
| JP | 2006052407 | | 2/2006 |
| JP | 2006176662 | | 7/2006 |
| WO | WO 2005/056356 | * | 6/2005 |

OTHER PUBLICATIONS

Machine translation of JP 11-335566, Dec. 1999.*
http://en.wikipedia.org/wiki/Triazine, Jun. 30, 2012.*
PCT/EP2008/065322 International Search Report, Apr. 2009.

* cited by examiner

*Primary Examiner* — Roberto Rabago
(74) *Attorney, Agent, or Firm* — Michael Best & Friedrich LLP

(57) ABSTRACT

The invention relates to a wiper rubber for windshield wipers, which contains at least one rubber component that is cured by vulcanization, the material of the wiper rubber containing, at least in the unvulcanized state, a combination of a cross-linking agent with sulfur and/or with a sulfur donor.

20 Claims, 2 Drawing Sheets

WIPER RUBBER FOR WINDSHIELD WIPERS

BACKGROUND OF THE INVENTION

The present invention relates to a wiper rubber for windshield wipers, and also to use of the wiper rubber.

Conventional wiper blades for windshield wipers are blades manufactured from rubber materials which have not only high resistance to ozone and UV radiation but also in particular high abrasion resistance and a low coefficient of friction on a glass pane requiring cleaning. The only way of complying with this demanding requirements profile is to use a suitable selection of the rubber materials used, and also to use suitable processing conditions. In particular here, stringent requirements are placed upon the processing auxiliaries used to provide a suitable degree of crosslinking during the vulcanization of the corresponding rubber material. These are in particular substances that function as sulfur donors to form sulfide bridges or that function as vulcanization accelerator system.

Ethylenethiourea (ETU) is nowadays used for vulcanizing rubber mixtures made of natural rubber and chloroprene. It accelerates the hardening of both natural rubber and of polychloroprene. However, the use of ETU is undesirable for occupational health reasons, because of its suspected teratogenicity and/or carcinogenicity.

It is also known that tetramethylthiuram disulfide (TMTD) can be used as sulfur donor for vulcanizing rubber materials. The mechanism of action of that compound is based on releasing nitrosamines, which are likewise hazardous to health.

There are also alternative rubber materials disclosed in U.S. Pat. No. 6,495,625 B1, comprising a crosslinking agent, and also a vulcanization accelerator.

SUMMARY OF THE INVENTION

It is an object of the present invention to provide a wiper rubber which is intended for windshield wipers and which complies with an appropriate requirements profile, and the production of which complies with occupational health requirements.

The underlying concept here is that, at least in the unvulcanized state, there is a curing agent, and also a sulfur donor, present in the wiper rubber material, thus providing compliance with the mechanical requirements profile, namely high abrasion resistance, and also a low coefficient of friction on a surface requiring cleaning.

It is advantageous to use a triazine or a thiadiazole as crosslinking agent. The sulfur donor used moreover comprises by way of example a dithiophosphate and/or a caprolactam disulfide. An advantage, from the point of view of occupational health, is that the handling of the abovementioned compounds is markedly less problematic than that of ETU- or TMTD-containing vulcanization systems.

It is also advantageous that, at least in the unvulcanized state, the wiper rubber material also comprises a vulcanization accelerator, for example in the form of a sulfenamide, of a guanidine, of a thiuram, and/or of a thiazole. A vulcanization system in the form of a combination of the substances mentioned as crosslinking agent, sulfur donor and, respectively, vulcanization accelerator gives a wiper rubber which complies with the appropriate mechanical requirements and the production of which is not attended by any increased risk to health.

In one particularly advantageous embodiment of the present invention, the wiper rubber material comprises, as rubber component, a mixture of natural rubber with chloroprene, with polyisoprene, and/or with at least to some extent epoxidized natural rubber. During the vulcanization process, these abovementioned rubber components can be hardened in a particularly advantageous manner with the abovementioned vulcanization system made of crosslinking agent, vulcanization accelerator, and sulfur donor.

BRIEF DESCRIPTION OF THE DRAWINGS

One embodiment of the invention is shown in the drawing and is explained in more detail in the description below.

DETAILED DESCRIPTION

Figure 1:
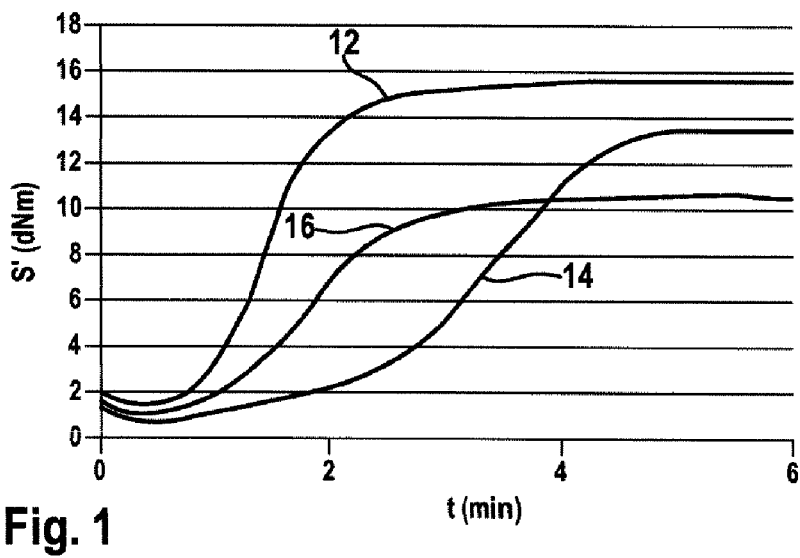
FIG. 1 shows a plot of the kinetic behavior of two rubber mixtures with different rubber components, and also of a corresponding mixture of the same, as a function of time, where the respective vulcanization systems have been designed for rapid hardening of the respective individual rubber component.

An inventive wiper rubber for wiper blades of windshield wipers of a motor vehicle encompasses first a matrix made of a rubber material and comprising, as rubber components, by way of a example a mixture of natural rubber (NR) with polychloroprene (CR), with polyisoprene (IR), and/or with at least to some extent epoxidized natural rubber (ENR). The epoxidized natural rubber here has by way of example a degree of epoxidation of from 15 to 50% by weight, preferably from 15 to 25% by weight.

Based on the total content of rubber components of the wiper rubber, the content of chloroprene is by way of example at least 20% by weight, preferably at least 25% by weight, in particular 40% by weight. The content of natural rubber, of polyisoprene, and/or of epoxidized natural rubber is moreover by way of example at least 30% by weight, based on the total content of rubber components, preferably 40% by weight, and in particular 60% by weight.

The wiper rubber material moreover comprises by way of example one or more fillers. Suitable design of filler mixture can have a great effect on the mechanical properties of the resultant wiper rubber. Fillers that can be used are not only furnace black and/or thermal black but also "white" fillers, such as zinc oxide, alkaline earth metal sulfates, alkaline earth metal carbonates, and others. The admixed filler content here, based on 100 parts by weight of rubber components present in the rubber material, is by way of example from 20 to 150 parts by weight, preferably from 20 to 100 parts by weight, and in particular from 25 to 70 parts by weight.

In order to ensure an adequate degree of crosslinking of the rubber components during the vulcanization process of the wiper rubber material, the wiper rubber material comprises, at least in the unvulcanized state, a combination of an appropriate crosslinking agent with sulfur and/or with a substance functioning as sulfur donor. The term sulfur donor here means a chemical substance which, under the conditions of a vulcanization process, provides sulfur in neutral or anionic form as reactant for forming disulfide bridges within the rubber material. Examples of suitable rubber donors are dithiophosphates, benzothiazoles, and in particular non-nitrosamine-releasing thiurams, and also caprolactam disulfides, and mixtures of the same. Based on the total content of rubber components, the amount of the sulfur donor present in the wiper rubber material, at least in the unvulcanized state thereof, is by way of example from 0.01 to 8% by weight, preferably from 0.3 to 5% by weight, and in particular from 0.5 to 3% by weight.

Examples of crosslinking agents used are triazines or thiadiazoles, or a mixture of the same. Based on the total content of rubber components, the amount of the crosslinking agent present in the wiper rubber material, at least in the unvulcanized state thereof, is by way of example from 0.01 to 8% by weight, preferably from 0.3 to 5% by weight, and in particular from 0.5 to 3% by weight.

In order to achieve rapid vulcanization of the wiper rubber without loss of mechanical durability, a vulcanization accelerator is preferably also added to the wiper rubber material. By way of example, this can take the form of a sulfenamide, e.g. a thiazolesulfenamide, of a guanidine, of a thiuram, of an alkylthiazolidinethione, or of a thiazole. The amount of the vulcanization accelerator present here in the wiper rubber material, at least in the unvulcanized state of the wiper rubber, is by way of example from 0.1 to 8% by weight, preferably from 0.3 to 5% by weight, and in particular from 0.5 to 3% by weight.

A "secondary vulcanization accelerator" can moreover be added to the wiper rubber material in the unvulcanized state. This functions to permit achievement of a further, targeted acceleration of the vulcanization process. Examples of secondary vulcanization accelerators added here are dithiophosphates, e.g. transition metal alkyl dithiophosphates. Based on the total content of rubber components, the amount of these secondary vulcanization accelerators present in the wiper rubber material, at least in the unvulcanized state thereof, is by way of example from 0.01 to 5% by weight, preferably from 0.3 to 3% by weight.

Alongside the vulcanization accelerators, it is also possible to add a metal oxide, for example magnesium oxide or zinc oxide, to the wiper rubber material. These provide activation and control of the vulcanization rate.

The wiper rubber described is advantageously suitable for wiper blades of windshield wipers, in particular for mobile applications, and also for door seals.

Example 1

Rubber mixtures constituted as follows were subjected to a vulcanization reaction.

|   |   |   | 1 | 2 | 3 |
|---|---|---|---|---|---|
| 1 | NR |   | 100 |   | 60 |
| 2 | CR |   |   | 100 | 40 |
| Mechanical properties |   |   |   |   |   |
| Shore hardness | °SH A |   | 63.0 | 58.0 | 55.0 |
| 100% modulus | N/mm$^2$ |   | 2.3 | 2.1 | 1.6 |
| Ultimate tensile strength | N/mm$^2$ |   | 21.6 | 13.6 | 20.4 |
| Elongation at break | % |   | 523 | 373 | 639 |
| Tension set | % |   | 22 | 22 | 27 |

FIG. 1 shows the kinetic behavior of the rubber mixtures of Example 1 during the vulcanization reaction, in the form of a plot of the elastic moment S' of the rubber mixtures as a function of time.

FIG. 1 illustrates the kinetic behavior of two rubber systems which comprise, as rubber component, only natural rubber and, respectively, chloroprene, and also in each case comprise a vulcanization system optimized for the vulcanization of this single rubber component. Test curve 12 here corresponds to the kinetic behavior of a rubber mixture comprising natural rubber, and test curve 14 corresponds to the kinetic behavior of a rubber mixture comprising chloroprene.

If the two rubber frictions are mixed with one another with a ratio of 60 to 40, the resultant test curve is 16. It can be seen that the use of a mixture of respectively vulcanization-optimized systems for natural rubber and chloroprene does not give an optimized system for a rubber system comprising a mixture of natural rubber and chloroprene.

Example 2

Rubber mixtures constituted as follows were subjected to a vulcanization reaction.

|   |   |   | 1 | 2 | 3 | 4 |
|---|---|---|---|---|---|---|
| 1 | NR |   | 60 | 60 |   |   |
| 2 | CR |   | 40 | 40 | 100 | 100 |
| 3 | Mastication agent |   | 0.63 | 0.63 | 0.63 | 0.63 |
| 4 | MgO |   | 1.5 | 1.5 | 1.5 | 1.5 |
| 5 | Ozone stabilizer |   | 0.8 | 0.8 | 0.8 | 0.8 |
| 6 | Processing aids |   | 2 | 2 | 2 | 2 |
| 7 | Carbon black |   | 27 | 27 | 27 | 27 |
| 8 | Alkylthiazolidine-thione |   |   | 4 |   | 4 |
| 9 | Sulfur |   | 1.5 | 1.5 | 1.5 | 1.5 |
| 10 | ZnO |   | 5.5 | 5.5 | 5.5 | 5.5 |
| 11 | Benzothiazole-sulfenamide |   | 1 | 1 | 1 | 1 |
| 12 | Sulfur donor |   | 2 | 2 | 2 | 2 |
| 13 | Triazine |   | 1 | 1 | 1 | 1 |
| 14 | Dithiophosphate |   | 2 | 2 | 2 | 2 |
| 15 | Retarder |   | 0.5 | 0.5 | 0.5 | 0.5 |
| Mechanical properties |   |   |   |   |   |   |
| Shore hardness | °SH A |   | 57.0 | 57.5 | 54.0 | 63.5 |
| 100% modulus | N/mm$^2$ |   | 2.2 | 2.4 | 1.4 | 3.0 |
| Ultimate tensile strength | N/mm$^2$ |   | 17.8 | 20.0 | 16.1 | 13.8 |
| Elongation at break | % |   | 746 | 821 | 906 | 562 |
| Tension set | % |   | 17.8 | 21.1 | 45.0 | 38.0 |

Figure 2:
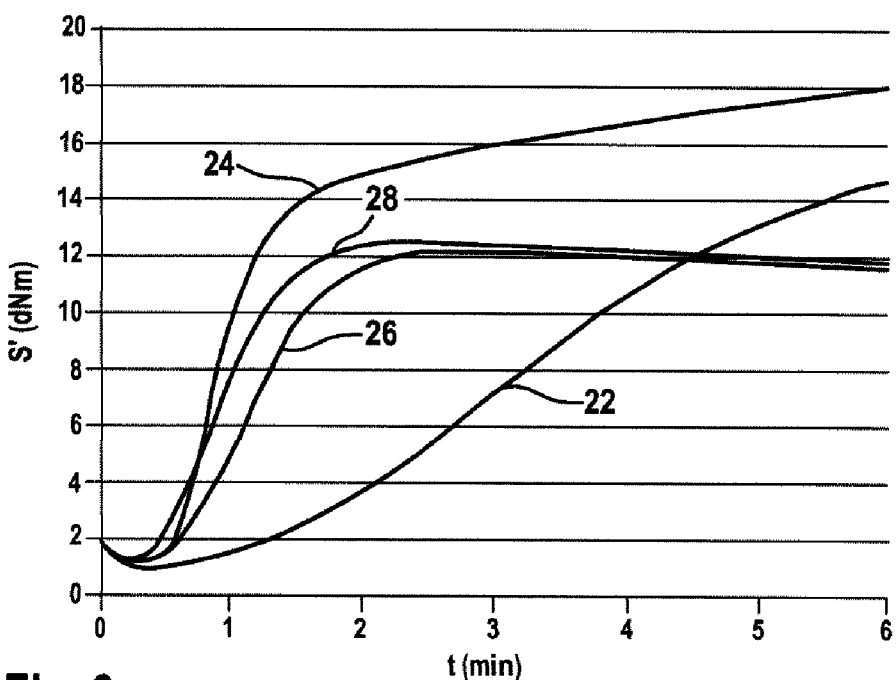
FIG. 2 shows a plot of the kinetic behavior of rubber mixtures as a function of the nature of the curing agent added, as a function of time, where the curing agent has been optimized for the hardening of the relevant individual rubber component.

FIG. 2 shows the kinetic behavior of the rubber mixtures of Example 2 during the vulcanization reaction, in the form of a plot of the elastic moment S' of the rubber mixtures as a function of time.

FIG. 2 shows the kinetic behavior of two rubber systems which comprise only chloroprene as rubber component, where one of the rubber systems comprises an alkylthiazolidinethione as a vulcanization accelerator optimized for the vulcanization of chloroprene. Test curve 22 here corresponds to the kinetic behavior of a rubber mixture comprising chloroprene without alkylthiazolidinethione, and test curve 24 corresponds to the kinetic behavior of a rubber mixture comprising chloroprene with alkylthiazolidinethione.

The kinetic behavior of two rubber systems respectively comprising a mixture of CR and NR as rubber component is also illustrated, where one of rubber systems comprises alkylthiazolidinethione as vulcanization system. Test curve 26 here corresponds to the kinetic behavior of a rubber mixture comprising CR/NR without alkylthiazolidinethione, and test curve 28 corresponds to the kinetic behavior of a rubber mixture comprising CR/NR with alkylthiazolidinethione as vulcanization system.

It can be seen that the addition of alkythiazolidinethione does not only have a great effect on the kinetic behavior of a straight chloroprene material during the vulcanization process, but also has an effect, which although not large is nevertheless favorable, on the vulcanization behavior of a mixture of natural rubber and chloroprene. However, it is clear that there is no linear relationship that can be used to derive the vulcanization behavior of a rubber mixture comprising NR/CR.

The addition of alkylthiazolidinethione to the mixture comprising exclusively chloroprene moreover has a marked effect on the subsequent mechanical behavior of the resultant rubber material. The mixture comprising exclusively chloroprene exhibits a markedly rising 100% modulus and, respectively, Shore hardness; only a small effect is observed in the mixture comprising NR/CR.

Example 3

Rubber mixtures constituted as follows were subjected to a vulcanization reaction.

|   |   |   | 1 | 2 | 3 |
|---|---|---|---|---|---|
| 1 | NR |  | 60 | 100 |  |
| 2 | CR |  | 40 |  | 100 |
| 3 | Mastication agent |  | 0.63 | 0.63 | 0.63 |
| 4 | MgO |  | 1 | 1 | 1 |
| 5 | Ozone stabilizer |  | 0.8 | 0.8 | 0.8 |
| 6 | Processing aids |  | 2 | 2 | 2 |
| 7 | Carbon black |  | 27 | 27 | 27 |
| 8 | Sulfur |  | 1.5 | 1.5 | 1.5 |
| 9 | ZnO |  | 5.5 | 5.5 | 5.5 |
| 10 | Amine-modified fatty acids |  | 2 | 2 | 2 |
| 11 | Dithiophosphate |  | 2 | 2 | 2 |
| 12 | Benzothiazole |  | 1 | 1 | 1 |
| 13 | Sulfur donor (dithiophosphate) |  | 2 | 2 | 2 |
| 14 | Triazine |  | 0.5 | 0.5 | 0.5 |
| 15 | Retarder |  | 1 | 1 | 1 |
| Mechanical properties |  |  |  |  |  |
| Shore hardness | °SH A |  | 53.0 | 49.5 | 52.0 |
| 100% modulus | N/mm$^2$ |  | 1.7 | 1.3 | 1.2 |
| Ultimate tensile strength | N/mm$^2$ |  | 19.7 | 17.5 | 12.2 |
| Elongation at break | % |  | 656 | 572 | 857 |
| Tension set | % |  | 16.4 | 15.3 | >45.3 |

Figure 3:
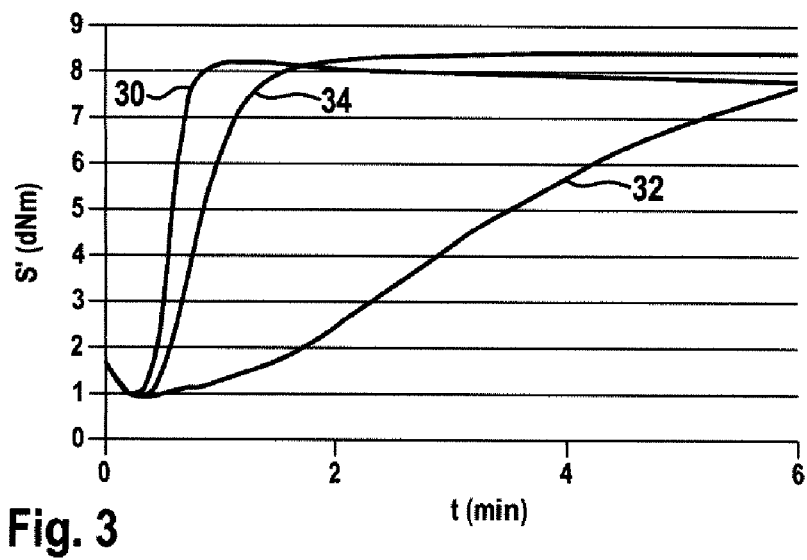
FIG. 3 shows a plot of the kinetic behavior of two rubber mixtures with different rubber components, and also of a mixture of the same, as a function of time, as in a first inventive example of the present invention.

FIG. 3 shows the kinetic behavior of the rubber mixtures of Example 3 during the vulcanization reaction in the form of a plot of the elastic moment S' of the rubber mixture as a function of time. 30 here indicates the kinetic behavior of a rubber mixture comprising only natural rubber as rubber component, while 32 indicates the kinetic behavior of a rubber mixture comprising only chloroprene as rubber component, and 34 indicates the kinetic behavior of a rubber mixture comprising, as rubber component, a mixture of natural rubber and chloroprene, using a suitable vulcanization system composed of sulfur donor, curing agent, and vulcanization accelerator.

Consideration of the tensile strain properties clearly shows the synergistic effect of a blend of NR and CR in this example. Ultimate tensile strength and 100% modulus are higher than when the individual components CR and NR are used alone.

It is also clear that although the vulcanization system of the invention has only limited suitability for the crosslinking of rubber mixtures comprising only CR and, respectively, NR as rubber component, it has very good suitability for the crosslinking of a rubber mixture encompassing a mixture of NR and CR.

Example 4

Rubber mixtures constituted as follows were subjected to a vulcanization reaction.

|   |   |   | 1 | 2 | 3 | 4 |
|---|---|---|---|---|---|---|
| 1 | NR |  | 70 | 60 | 50 | 40 |
| 2 | CR |  | 30 | 40 | 50 | 60 |
| 3 | Mastication agent |  | 0.63 | 0.63 | 0.63 | 0.63 |
| 4 | MgO |  | 1.5 | 1.5 | 1.5 | 1.5 |
| 5 | Ozone stabilizer |  | 0.8 | 0.8 | 0.8 | 0.8 |
| 6 | Processing aids |  | 2 | 2 | 2 | 2 |
| 7 | Carbon black |  | 27 | 27 | 27 | 27 |
| 8 | Sulfur |  | 1.5 | 1.5 | 1.5 | 1.5 |
| 9 | ZnO |  | 5.5 | 5.5 | 5.5 | 5.5 |
| 10 | Benzothiazole-sulfenamide |  | 1 | 1 | 1 | 1 |
| 11 | Sulfur donor |  | 2 | 2 | 2 | 2 |
| 12 | Triazine |  | 1 | 1 | 1 | 1 |
| 13 | Dithiophosphate |  | 2 | 2 | 2 | 2 |
| 14 | Retarder |  | 0.5 | 0.5 | 0.5 | 0.5 |
| Mechanical properties |  |  |  |  |  |  |
| Shore hardness | °SH A |  | 58.0 | 56.5 | 58.5 | 59.5 |
| 100% modulus | N/mm$^2$ |  | 2.2 | 2.2 | 2.5 | 2.6 |
| Ultimate tensile strength | N/mm$^2$ |  | 19.9 | 21.0 | 18.8 | 16.4 |
| Elongation at break | % |  | 733 | 871 | 760 | 653 |
| Tension set | % |  | 11.7 | 12.8 | 16.1 | 23.3 |

Figure 4:
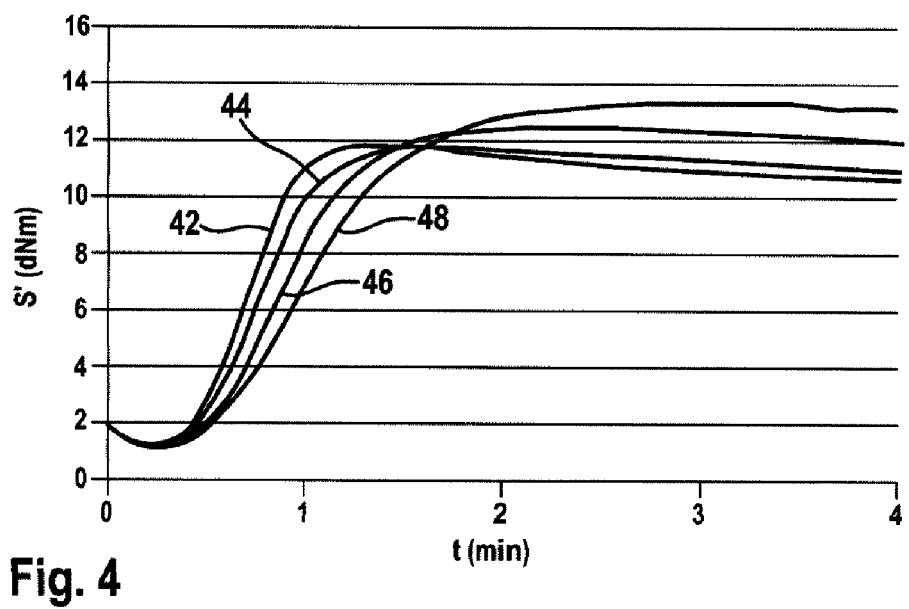
FIG. 4 shows a plot of the kinetic behavior of rubber mixtures as in further inventive examples of the present invention, varying the mixing ratio of the rubber components.

FIG. 4 shows the kinetic behavior of rubber mixtures 1 to 4 of Example 4 during a vulcanization reaction in the form of a plot of the elastic moment S' of the rubber mixtures as a function of time.

FIG. 4 illustrates the kinetic behavior of rubber mixtures which comprise, as rubber component, mixtures of NR and CR. Test curve 42 here corresponds to the kinetic behavior of rubber mixture 1, test curve 44 here corresponds to the kinetic behavior of rubber mixture 2, test curve 46 here corresponds to the kinetic behavior of rubber mixture 3, and test curve 48 here corresponds to the kinetic behavior of rubber mixture 4.

It can be seen that the mixing ratio of the natural rubber and chloroprene exhibits a marked effect on the hardening kinetics of the vulcanization reaction.

The invention claimed is:

1. A rubber windshield wiper blade comprising at least one vulcanization-hardened rubber component, characterized in that, at least in the unvulcanized state, the wiper blade material comprises a crosslinking agent, sulfur and a sulfur donor, wherein the rubber component comprises a mixture of natural rubber with chloroprene rubber, and wherein the crosslinking agent comprises a triazine and the sulfur donor is a caprolactam disulfide.

2. The windshield wiper blade as claimed in claim 1, characterized in that, at least in the unvulcanized state of the wiper blade material, the content of crosslinking agent, sulfur, and sulfur donor, based on the total content of rubber components in the wiper blade material, is from 0.3 to 30% by weight.

3. The windshield wiper blade as claimed in claim 1, characterized in that, at least in the unvulcanized state of the wiper blade material, the amount of the sulfur donor present, based on the total content of rubber components in the wiper blade material, is from 0.01 to 8% by weight.

4. The windshield wiper blade as claimed in claim 1, characterized in that, at least in the unvulcanized state, the wiper blade material also comprises a vulcanization accelerator.

5. The windshield wiper blade as claimed in claim 4, characterized in that the vulcanization accelerator is a sulfenamide, a guanidine, a thiuram, an alkylthiazolidinethione and/or a thiazole.

6. The windshield wiper blade as claimed in claim 5, characterized in that the sulfenamide is a thiazolesulfenamide.

7. The windshield wiper blade as claimed in claim 4, characterized in that, at least in the unvulcanized state of the wiper blade material, the amount of the vulcanization accelerator present, based on the total content of rubber components in the wiper blade material, is from 0.1 to 8% by weight.

8. The windshield wiper blade as claimed in claim 1, characterized in that a secondary vulcanization accelerator has been provided in the form of a transition metal alkyl dithiophosphate.

9. The windshield wiper blade as claimed in claim 1, characterized in that the amount of chloroprene rubber present, based on the total content of rubber components, is at least 20% by weight.

10. The windshield wiper blade as claimed in claim 1, characterized in that the amount of natural rubber present, based on the total content of rubber components, is at least 30% by weight.

11. The windshield wiper blade as claimed in claim 1, characterized in that the wiper blade material also comprises a metal oxide.

12. A rubber windshield wiper blade comprising at least one vulcanization-hardened rubber component, characterized in that, at least in the unvulcanized state, the wiper blade material comprises a crosslinking agent, a vulcanization accelerator, at least one of sulfur and a sulfur donor, no ethylenethiourea, and no tetramethylthiuram disulfide, wherein the crosslinking agent comprises a triazine and the vulcanization accelerator is an alkylthiazolidinethione, and wherein the rubber component comprises a mixture of natural rubber with chloroprene rubber.

13. The windshield wiper blade as claimed in claim 12, characterized in that, at least in the unvulcanized state of the wiper blade material, the content of crosslinking agent, sulfur, and sulfur donor, based on the total content of rubber components in the wiper blade material, is from 0.3 to 30% by weight.

14. The windshield wiper blade as claimed in claim 12, characterized in that the sulfur donor is a dithiophosphate, a thiuram, and/or a caprolactam disulfide.

15. The windshield wiper blade as claimed in claim 12, characterized in that, at least in the unvulcanized state of the wiper blade material, the amount of the sulfur donor present, based on the total content of rubber components in the wiper blade material, is from 0.01 to 8% by weight.

16. The windshield wiper blade as claimed in claim 12, characterized in that, at least in the unvulcanized state of the wiper blade material, the amount of the vulcanization accelerator present, based on the total content of rubber components in the wiper blade material, is from 0.1 to 8% by weight.

17. The windshield wiper blade as claimed in claim 12, characterized in that a secondary vulcanization accelerator has been provided in the form of a transition metal alkyl dithiophosphate.

18. The windshield wiper blade as claimed in claim 12, characterized in that the amount of chloroprene rubber present, based on the total content of rubber components, is at least 20% by weight.

19. The windshield wiper blade as claimed in claim 12, characterized in that the amount of natural rubber present, based on the total content of rubber components, is at least 30% by weight.

20. The windshield wiper blade as claimed in claim 12, characterized in that the wiper blade material also comprises a metal oxide.

* * * * *